United States Patent [19]

Darley

[11] 3,746,109

[45] July 17, 1973

[54] SHALE STABILIZING DRILLING PROCESS USING AN AQUEOUS SILICATE SOLUTION OF BALANCED SALINITY

[75] Inventor: Henry C. H. Darley, Houston, Tex.

[73] Assignee: Shell Oil Company, Houston, Tex.

[22] Filed: Jan. 10, 1972

[21] Appl. No.: 216,718

[52] U.S. Cl. ............... 175/66, 175/72, 252/8.5 B
[51] Int. Cl. ................. E21b 21/04, E21b 33/138
[58] Field of Search ................... 175/65, 66, 72; 166/292, 293; 252/8.5 B

[56] References Cited
UNITED STATES PATENTS

| | | | |
|---|---|---|---|
| 2,146,693 | 2/1939 | Vietti et al. | 252/8.5 B |
| 2,165,823 | 7/1939 | Vietti et al. | 252/8.5 B |
| 2,165,824 | 7/1939 | Vietti et al. | 252/8.5 B |
| 2,205,609 | 6/1940 | Vail et al. | 252/8.5 B |
| 2,353,230 | 7/1944 | Garrison et al. | 252/8.5 B |
| 3,318,396 | 5/1967 | Tailleur | 252/8.5 B |
| 3,533,480 | 10/1970 | Cheneuert et al. | 175/66 |
| 3,679,001 | 7/1972 | Hill | 252/8.5 B X |

Primary Examiner—David H. Brown
Attorney—Harold L. Denkler and H. W. Coryell

[57] ABSTRACT

In a drilling process using a low viscosity aqueous drilling fluid of low solids content, the stabilization of a shaly earth formation is improved by using a low viscosity aqueous silicate solution having a total solute concentration that inhibits the transferring of water from the solution to the shale.

6 Claims, No Drawings

SHALE STABILIZING DRILLING PROCESS USING AN AQUEOUS SILICATE SOLUTION OF BALANCED SALINITY

CROSS-REFERENCE TO COPENDING PATENT APPLICATION

This patent application is related to patent application Ser. No. 39,676, filed May 20, 1970. The present and prior applications relate to stabilizing shales by treating them with relatively non-viscous aqueous solutions of alkali metal silicate. The prior application is particularly concerned with using a relatively dilute and relatively low pH aqueous silicate solution for treating relatively hard shales by forcing the solutions to penetrate into the shales. The present application is particularly concerned with a low viscosity aqueous silicate solution drilling fluid which is effective in stabilizing substantially all shales, i.e., either hard shales or strongly swelling soft shales.

BACKGROUND OF THE INVENTION

The present invention relates to treating shaly earth formations to improve their stability. It is useful in the treatment of either hard or consolidated or mid-continent shales such as Springer, Wapiabi, Atoka, or the like, or the strongly swelling soft bentonitic or montmorillonitic or Gulf Coast shales such as the miocenes or the like.

The term shale is used (as is common in drilling logs and similar field reports) to refer to shaly earth formations ranging from clays that are highly reactive with water to substantially completely lithified material such as the clay stones and slate that are relatively inert to water. The present treatments stabilize the shaly earth formations by reducing their tendency to create borehole instability problems due to heaving, sloughing, caving, causing tight hole or hole enlargement problems or the like. The hard shales are particularly susceptible to causing borehole instability when they are highly stressed, for example, in relatively deep subterranean locations and/or permeated with fractures which may or may not have healed or become re-bonded. The soft shales are particularly susceptible to water damage and tend to first swell and then become soft and gooey and finally to form a mud.

In drilling into water-sensitive strongly swelling, soft shaly earth formations, such as bentonitic or Gulf Coast soft shales, it has been proposed (e.g., in U. S. Pat. Nos. 2,146,693; 2,165,823 and 2,165,824) to use relatively low fluid-loss (or filter-loss) aqueous drilling muds containing relatively large proportions of dispersed solids and dissolved sodium silicates. Such muds as generally recommended, contain concentrations of the aqueous 50 Be' sodium silicate $Na_2O:SiO_2$ ratio 1:2, pH 12.5 from about 25 to 90 percent by volume and generally between 30 percent and 70 percent by volume and 70 to 30 percent saturated salt. In such muds, the combination of the suspended clay particles that provide the filter-loss control and the solid particles that become stably suspended during a drilling operation cooperate to form very viscous muds which are difficult to handle.

In air-drilling operations, water-sensitive shaly earth formations have been contacted with aqueous silicates that tend to seal off water-producing formations. For example, in air-drilling operations, as described in U.S. Pat. No. 3,259,189, water-sensitive shaly earth formations are contacted with concentrated aqueous silicate solutions that coat the shaly portions of the borehole wall and keep them from collapsing when they are contacted by water. In the aqueous solutions used in that process, the silicate or water-glass concentration is about 90 percent by volume and the shaly earth formations are simply wetted with the solutions.

SUMMARY OF THE INVENTION

The present invention is a process for stabilizing a shaly earth formation exposed along the borehole of the well by treating the shale in the formation with a relatively low viscosity aqueous silicate solution that is circulated and maintained as a relatively low solids, fast drilling fluid. The circulating drilling fluid is a relatively high pH aqueous silicate salt solution (a) having a pH and silicate concentration substantially equal to those of a water solution of from about 4 to 11 percent by weight of a mixture of sodium oxide and silicon dioxide in a weight ratio of 1 to 2, and (b) containing enough of at least one additional solute to provide a total solute concentration that is correlated with the effective water-transfer activity of the water in the pores of the shale so that, when the silicate solution is in contact with the shale, substantially no water is transferred from the silicate solution to the shale. The circulating drilling fluid is maintained by removing bit cutting solids to the extent required to leave less than about 2 percent by weight of bit cutting solids suspended in the drilling fluid, adding back substantially the amount of silicate salt that was removed by deposition on bit cuttings and other earth formation solids, and increasing the pH as required to maintain one at which the silicate salt is soluble.

DESCRIPTION OF THE INVENTION

The present invention involves a discovery that when an aqueous drilling fluid contacts a shale the water transfer between the solution and the shale is a unique phenomena. In some aspects, such a water transfer is related to an osomotic pressure phenomenon, i.e., one in which a solvent is transferred through a semi-permeable membrane from a dilute solution to a more concentrated solution. In a shale the pores tend to act as the semi-permeable membrane and the activity of the water in the pores of the shale with respect to the transfer of water tends to be similar to that of a relatively concentrated aqueous solution, due to the water adsorbtive forces of the solid particles or platelets in the shale matrix. As used herein, the "activity" of a water-containing fluid in contact with a shale is referred to as a high activity if water is transferred from the fluid to the shale. In such a situation an osmotic pressure effect or phenomenon is an important factor, but not the only factor, involved in the transfer of water.

If osmosis were the only factor a high activity in an aqueous treating solution could be reduced and could be counter-balanced by simply increasing the concentration of the solute in the aqueous solution to provide an activity equal to or less than that of the water in the pores of the shale. For example, where an oil base or invert emulsion drilling fluid contacts a shale, a water transfer can be prevented and the shale can be stabilized by simply adjusting the concentration of the solute in the aqueous phase of the oil base mud. But where an aqueous solution contacts a shale, no matter whether the aqueous solution activity is adjusted to be above, at or below the balancing point, the shale tends to be unstable.

An alkali metal silicate is, therefore, an essential ingredient of the present relatively low viscosity, aqueous, shale stabilizing, drilling fluid. It appears that two conditions must be fulfilled if a stable bore-hole is to be drilled into a hard or swelling shale while circulating a low viscosity aqueous drilling fluid: (1) a stabilizing action by a soluble silicate salt solution is needed to maintain the mechanical integrity of the borehole; and (2) an effective counter-balancing of the water transfer activity of the aqueous solution is needed to prevent a transfer of water from the solution to the shale.

In the present invention, the capability of maintaining the solubility of an amount of an alkali metal silicate that is effective for stabilizing a shale in an aqueous liquid solution while maintaining the total solute concentration of that liquid high enough to provide an activity at least as low as that of the water in the shale is facilitated by using an alkali metal silicate that is or is substantially equivalent to a solution of from about 10 to 25 parts by volume of a Diamond Alkali Grade 50 aqueous sodium silicate per 100 parts by volume of water. That Grade 50 silicate is an aqueous liquid solution containing about 14.7 percent by weight sodium oxide and 29.4 percent by weight of silicon dioxide, i.e., a 1:2 ratio of sodium oxide to silicon dioxide. The present shale treating solutions preferably consist essentially of aqueous solutions containing from about 4 to 11 percent by weight of a mixture of sodium oxide and silicon dioxide in a weight ratio of 1 to 2 plus the specified additional solutes. The pH of such solutions is preferably kept about 11.3 and below 12.4.

In the present shale treating solutions, materials suitable for use as the additional solutes (in addition to the alkali metal silicates) include: monovalent metal halides, carbonates, sulfates, or the like, such as sodium chloride and/or potassium carbonate, or the like; water soluble organic materials, such as the lower molecular weight alcohols and/or glycols, such as ethylene glycol, or the like; or substantially any water soluble material that is compatible with the shale stabilizing effects of the alkali metal silicate, is compatible with the maintenance of a relatively low viscosity, such as a viscosity between about 1 and 2 centipoises, and is adapted to lower the osmotic pressure of the solution.

Table 1 shows the composition of aqueous solutions having activities that balance with those of the waters in shales having the bulk densities indicated. The activities were measured by both vapor adsorption tests and tests in the triaxial testor described in the article, "A Laboratory Investigation of Borehole Stability," by H. C. H. Darley, JOURNAL PETROLEUM TECHNOLOGY, July, 1969. Shale specimens were reconstituted from the drill cuttings of the specified types of shales. Slurries of the cuttings were dehydrated in a compaction cell to yield specimens having bulk densities such as Miocene shale densities of from 2.17 to 2.33. In the triaxial testor tests, the compacted specimens were placed in the testor and an isostatic stress of 1,000 psi was applied while a one-half inch borehole was drilled. The borehole was then filled with the test solution to which 100 psi was applied (against a formation fluid pressure of only about atmospheric). The fluid in the borehole was generally not circulated in order to study the transfer of water through the borehole wall by circulating fluid. After about 20 hours, the specimen was removed and a 1-inch outer diameter core was cut around the borehole. The water content of the tested specimen was determined from the core.

In the vapor adsorption tests the concentration of salt needed in an aqueous silicate solution to balance the activity of the solution with that of the water in the shales specimen was determined. Each specimen was sliced to eight slices, seven of which were placed in desiccators above portions of aqueous solution containing a fixed concentration of sodium silicate and increasing concentrations of salt. After a 1-day exposure, the specimens were weighed to determine the increases or decreases in weight due to adsorption or loss of water. The bulk density of the test specimen was determined by drying and weighing the eigth slice.

TABLE I.—COMPOSITION OF SOLUTIONS REQUIRED TO BALANCE MIOCENE SHALE SPECIMENS OF THE BULK DENSITY SPECIFIED

| | In vapor absorption test | | | | In triaxial tester | | | |
|---|---|---|---|---|---|---|---|---|
| Bulk density | Percent gr. 50 | Percent brine | Salinity of brine, g./100 cc. | Percent ethylene glycol | Percent gr. 50 | Percent brine | Salinity of brine, g./100 cc. | Percent ethylene glycol |
| 2.17 | 25 | 75 | 10 NaCl | 0 | 25 | 75 | 20 NaCl | 0 |
| 2.25 | 25 | 75 | 20 NaCl | 0 | 25 | 75 | 29 NaCl | 0 |
| 2.33 | 25 | 70 | Saturated NaCl | 5 | 25 | 60 | Saturated NaCl | 15 |
| 2.33 | 25 | 75 | 43 $K_2CO_3$ | 0 | 25 | 75 | 48 $K_2CO_3$ | 0 |

Table 2 shows the concentrations of potassium carbonate required to balance the activities of aqueous solutions containing various proportions of alkali metasilicate and the influence of the concentration of the silicate on the strength of the shales.

Table 2 shows the concentrations of potassium carbonate required to balance the activities of aqueous solutions containing various proportions of alkali metal silicate and the influence of the concentration of the silicate on the strength of the shales.

TABLE 2

INFLUENCE OF THE CONCENTRATION OF SODIUM SILICATE ON 2.33 BD MIOCENE SHALE SPECIMENS

| % v Gr. 50 | g/100cc $K_2CO_3$ Brine | Salinity of $K_2CO_3$ Required to balance | Hoop Strength at That Salinity |
|---|---|---|---|
| 70 | 30 | 43 | 2680 |
| 50 | 50 | 46 | 2470 |
| 25 | 75 | 48 | 2200 |
| 10 | 90 | 59 | 2140 |
| 0 | 100 | Hole Collapsed | |

As indicated in Table 2 the silicate concentration influences the activity of the solution and the concentration of potassium carbonate required to balance the activity of the solution decreases with increasing concentration of the silicate. The concentration of the silicate also effects the strength of the treated shale. Table 2 indicates hoop strengths (which were determined by standard testing methods) after the shales had been treated at the balancing salinity and the results indicate that the strengths increased with increasing concentration of silicate.

Table 3 shows failure times of reconstituted specimens of Atoka shale after treatment with aqueous liquids of the specified composition. The Atoka shale is typical of an illitic shale, which is a hard shale of the type to which the process of the prior application is particularly well suited.

Since the volumes of water absorbed by the illitic shales in a triaxial testor were too small to be accurately measured, a different procedure was used. The specimen was held under a high isostatic pressure at slightly below its yield point while the test fluid was kept static in the borehole under a pressure of 100 psi. If the specimen adsorbed a significant amount of water, the borehole would fail but because of the slow rate of adsorption, this might not occur for several days.

TABLE 3
TIME TO FAILURE OF RECONSTITUTED SPECIMENS OF ATOKA SHALE

| Borehold Fluid | Temp. (°F) | Applied Stress (psi) | Time to Failure |
|---|---|---|---|
| 25% Gr. 50 in distilled water | 75 | 2000 | 4305 min. |
| 25% Gr. 50 in distilled water | 75 | 2500 | 4575 min. |
| 25% Gr. 50 + 75% of 10 g/100 cc NaCl | 75 | 2500 | >1 week |
| 25% Gr. 50 + 75% of 20 g/100 cc NaCl | 75 | 2500 | >1 week |
| 25% Gr. 50 in distilled water + 2% ea. bentonite and starch | 75 | 2000 | 2 weeks |
| 25% Gr. 50 + 75% of 10 g/100 cc NaCl | 200 | 2500 | 80 min. |
| 25% Gr. 50 + 75% of 20 g/100 cc NaCl | 200 | 2500 | >1 day |

As indicated in Table 3, the balancing salinity for an aqueous solution containing about 25 percent by volume Grade 50 aqueous silicate is between about 0 and 10 grams per hundred cc of sodium chloride. This compares favorably with the results of 7 grams per 100 cc sodium chloride which were found by vapor phase method tests. As indicated, some of the tests were made at 200°F for periods limited to 1 day. While the results shown in Table 3 are not conclusive, they suggest that the balancing salinity for the Atoka shale at 200°F lies somewhere 10 and 20 grams per hundred cc of sodium chloride.

Table 4 shows results of tests of natural specimens of a Springer shale under an isostatic stress of 7,500 psi. With such natural shales, there is a relatively wide variation in failure times, with the results shown in the table are believed to be significant.

TABLE 4.—FAILURE TIME WITH SPRINGER SHALE SPECIMENS

| Composition of test fluid | | | | | Number of specimens failing in— | | | | |
|---|---|---|---|---|---|---|---|---|---|
| Percent gr. 50 | Percent brine | Salinity, g./100 cc. | Ethylene glycol (percent) | Diesel oil | <8 hours | 1 day | 2 days | 3 days | >3 days |
| Section of core from 2003'–2015' | | | | | | | | | |
| 0 | 100 | Saturated NaCl | 0 | 0 | 1 | | | | |
| 0 | 100 | 0 | 0 | 0 | 5 | | | | |
| 25 | 75 | 0 | 0 | 0 | | 2 | 2 | 1 | |
| 50 | 50 | 0 | 0 | 0 | | 2 | 2 | 1 | |
| ¹50 | 50 | 0 | 0 | 0 | | | | | 1 |
| 50 | 50 | Saturated NaCl | 0 | 0 | | | 1 | | 1 |
| 0 | 0 | 0 | 0 | 100 | | | ²1 | 1 | 2 |
| Section of core from 2029'–2030' | | | | | | | | | |
| ¹50 | 50 | 0 | 0 | 0 | | 1 | | | |
| 25 | 75 | Saturated NaCl | 0 | 0 | | 1 | | | |
| 25 | 75 | 75 K₂CO₃ | 0 | 0 | | | | | 2 |
| 50 | 50 | 75 K₂CO₃ | 0 | 0 | | | | | 1 |
| 25 | 50 | Saturated NaCl | 25 | 0 | | | | | 1 |
| 25 | 37.5 | do | 37.5 | 0 | | | | | 1 |
| 0 | 0 | 0 | 0 | 100 | | | | | 2 |

¹ Grade 40 sodium silicate.
² Diesel not dehydrated.

The results of tests with the illitic shales indicate that the sodium silicate brine with balanced solute concentrations can maintain stable boreholes. However, it appears that when water is adsorbed by an illitic shale, the mechanism of the failure is different than that observed in a montmorillonitic shale. With a montmorillonitic shale, the water is adsorbed in comparatively large volumes into the matrix of the shale and creates a soft swollen zone. With an illitic shale, the volume of water adsorbed is microscopic and there is no apparent softening or change in whole volume. On the other hand, water can often be seen to penetrate along old fracture lines and it is apparent that there is a relationship between the intensity of fracturing and time of failure. This tends to confirm the mechanics of failure postulated in the prior patent application; namely, that in the hard shales water penetrates into old healed fractures and the hydration of the fractures surfaces gives rise to swelling forces strong enough to break the fracture bonds.

The present shale treating fluids can advantageously be used as clear silicate drilling fluids for drilling into any shale, no matter how strongly swelling it may be, provided that the activity of the drilling fluid is maintained equal to or less than the activity of the water in the shale.

Where a low salinity drilling fluid is desired, for example, for logging purposes, the preferred formulations preferably contain Grade 40 aqueous sodium silicate, and mixtures of sodium chloride and ethylene glycol. In such a formulation, salt content can be less than 2 percent by weight of the aqueous solutions. Although potassium carbonate will not provide as low activities as sodium chloride and ethylene glycol, it may be advantageous where relatively high densities such as from about 10 to 12 pounds per gallon are desired without recourse to insoluble weighting materials.

The present solutions are best adapted for providing densities of less than about 12 ppg. Although additional weight could be provided by using concentrations above 25 percent by volume of commercial Grade 50 aqueous sodium silicate, such concentrations provide substantially no further benefit in shale stability increase, and may cause disadvantageously increases viscosities.

The present relatively non-viscous (e.g., 1-2 centipoise) aqueous silicate shale treating solutions have a tendency to inhibit the dispersion of drill cuttings. In a clear fluid drilling operation, if double decked shakers and desilters are used, such fluids can readily be maintained as a substantially solid free clear fluid containing less than about 2 percent by weight of dispersed drill cutting fines. This provides a combination of a freedom from suspended solids and a low viscosity that ensures a fast drilling rate and a relatively easy and inexpensive maintenance of the drilling fluid. Such fluids are particularly advantageous in drilling relatively thick bodies of shales or other low permeability formations.

Where relatively permeable formations are encountered, the present aqueous silicate shale treating fluids may be modified by the additions of a filtration control agent in order to reduce the filter loss. Prehydrolyzed starch or starch derivatives such as Dextrid (a starch derivative available from Bariod, Division of National Lead Co.) are particularly suitable filter loss reducing additives. The lignites tend to interfere with the protective action of silicate and the chrome ligno-sulfonates tend to be ineffective in solutions of the present type. Alternatively, a prehydrolyzed clay or attapulgite can be added to function as a bridging agent, if the amounts of bit cutting fines prove to be ineffective.

Where it is desired to increase the carrying capacity of the present shale treating fluids, ground asbestos is a preferable additive. If the problem is only in the removing of earth formation material or fill after round trips, it is recommended that a batch of asbestos be mixed in a separate tank and pumped round the hole before making a trip and discarded after it reaches the surface. In this manner the low solvent fast drilling characteristics of the fluid are maintained. Where it is necessary to circulate an asbestos continually Super Visbestos (available from Montello, Inc.) is particularly suitable because it can be used with a desilter.

We claim as our invention:

1. A well drilling process for circulating a low solids aqueous drilling fluid while stabilizing a shaly earth formation that is exposed along the borehole of the well comprising:

drilling while circulating a relatively and pH aqueous silicate salt solution (a) having a pH and a silicate concentration substantially equal to those of water a solution of from about 4 to 11 parts by weight of a mixture of sodium oxide and silicon dioxide in a weight ratio of 1:2, and (b) containing enough of at least one additional solute to provide a total solute concentration that is correlated with the effective water transfer activity of the water in the pores of the shale so that when the silicate solution is in contact with the shale, substantially no water is transferred from the silicate solution to the shale; and maintaining the circulating drilling fluid by removing bit cutting solids to the extent required to leave less than about 2 percent by weight of bit cutting solids suspended within the drilling fluid, adding back substantially the amount of silicate salt that is removed by deposition on bit cuttings and other earth formation solids, and increasing the pH to the extent required to provide one at which the silicate salt is soluble.

2. The process of claim 1 in which the total solute concentration of said aqueous silicate solution is substantially equal to one that causes substantially no water to be transferred into a specimen of the shale in said shaly earth formation where the specimen is maintained for a significant time in a desiccator above a portion of the solution.

3. The process of claim 1 in which said additional solute is sodium chloride.

4. The process of claim 1 in which said additional solute is potassium carbonate.

5. The process of claim 1 in which said additional solute is a mixture of a water soluble organic hydroxy compound and an inorganic electrolyte.

6. The process of claim 1 in which said additional solute is a mixture of ethylene glycol and sodium chloride.

* * * * *